(12) United States Patent
Abel et al.

(10) Patent No.: US 9,885,373 B1
(45) Date of Patent: Feb. 6, 2018

(54) LEAK-FREE PISTON STYLE ACCUMULATOR

(71) Applicant: HONEYWELL INTERNATIONAL INC., Morris Plains, NJ (US)

(72) Inventors: Steve Abel, Chandler, AZ (US); Matt McClure, Gilbert, AZ (US); Kellan Geck, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/290,202

(22) Filed: Oct. 11, 2016

(51) Int. Cl.
| | | |
|---|---|---|
| *F16L 55/04* | (2006.01) | |
| *F15B 1/24* | (2006.01) | |
| *F16L 55/05* | (2006.01) | |
| *F16L 55/055* | (2006.01) | |

(52) U.S. Cl.
CPC .............. *F15B 1/24* (2013.01); *F16L 55/04* (2013.01); *F16L 55/05* (2013.01); *F16L 55/055* (2013.01); *F15B 2201/31* (2013.01); *F15B 2201/411* (2013.01)

(58) Field of Classification Search
CPC ... F16L 55/05; F16L 55/055; F15B 2201/411; F15B 2201/31
USPC ............. 138/31, 30; 137/504; 220/721; 251/282; 303/87
See application file for complete search history.

(56) References Cited

U.S. PATENT DOCUMENTS

| | | | | |
|---|---|---|---|---|
| 3,930,521 A | * | 1/1976 | Zahid | F15B 1/08 137/516.27 |
| 3,939,872 A | * | 2/1976 | Wentworth, Jr. | F15B 1/103 137/494 |
| 4,046,162 A | | 9/1977 | Rodeghiero | |
| 4,067,360 A | | 1/1978 | Zirps | |
| 4,164,242 A | * | 8/1979 | Sandau | F15B 1/18 138/131 |
| 4,386,627 A | * | 6/1983 | Lachaux | F17C 7/00 137/514.3 |
| 4,461,322 A | | 7/1984 | Mills | |
| 4,570,972 A | * | 2/1986 | Pangos | B60G 17/0525 137/493 |
| 4,869,288 A | * | 9/1989 | Toshio | F16L 55/07 137/494 |
| 5,373,865 A | | 12/1994 | Jung et al. | |
| 5,819,802 A | * | 10/1998 | Fan | F16L 55/045 138/30 |
| 6,619,325 B2 | | 9/2003 | Gray, Jr. | |
| 6,866,066 B2 | | 3/2005 | Weber | |

(Continued)

*Primary Examiner* — Patrick F Brinson
(74) *Attorney, Agent, or Firm* — Lorenz & Kopf, LLP

(57) ABSTRACT

A fluid accumulator includes a tank, a piston, and a valve. The piston is movably disposed within the tank and divides the tank volume into a first fluid volume and a second fluid volume. The valve is coupled to the tank and includes a valve body, a valve element, a valve spring, a piston contact element, and a load limiter spring. The valve element is disposed within the valve body and is movable between an open position and a closed position. The valve spring has a first spring constant and supplies a force to the valve element that urges the valve element toward the open position. The piston contact element is spaced apart from, and is movable relative to, the valve element. The load limiter spring engages the valve element and the piston contact element, and has a second spring constant that is greater than the first spring constant.

20 Claims, 5 Drawing Sheets

(56) References Cited

U.S. PATENT DOCUMENTS

| | | | |
|---|---|---|---|
| 6,899,211 | B2 | 5/2005 | Came |
| 8,020,587 | B2 | 9/2011 | Gray, Jr. |
| 8,387,665 | B2 | 3/2013 | Lundberg et al. |
| 8,656,960 | B2 * | 2/2014 | Haecker .................... F15B 1/04 138/30 |
| 8,677,742 | B2 | 3/2014 | Basin et al. |
| 9,038,528 | B2 | 5/2015 | Weber et al. |
| 2006/0277904 | A1 | 12/2006 | Weber |
| 2014/0124063 | A1 | 5/2014 | Mayr et al. |
| 2014/0311577 | A1 | 10/2014 | Pekarsky et al. |

* cited by examiner

LEAK-FREE PISTON STYLE ACCUMULATOR

TECHNICAL FIELD

The present invention generally relates to accumulators, and more particularly relates to piston style accumulator that is substantially leak-free.

BACKGROUND

Many fluid systems include one or more fluid accumulators. A fluid accumulator may provide, for example, load topping when fluid power demand exceeds fluid supply or regulating system capabilities, and/or may maintain suitable fluid pressure in the event of a momentary fluid power drop-out, and/or may reduce pressure ripple, and/or provides damping for pressure transients and water hammer.

Fluid accumulators come in a variety of styles, depending upon the element that separates the working fluid, such as hydraulic fluid, from a pressurizing fluid, such as a gas. For example, the accumulator styles include bellows style, bladder style, diaphragm style, and piston style accumulators. Some accumulator styles are heavier than others, some are more expensive than others, and some are limited in size. One advantage of the piston style accumulator is that it is relatively lightweight and inexpensive, and spans a relatively large pressure range.

Unfortunately, the piston style accumulator also exhibits a drawback. The drawback is that it can exhibit gas-to-fluid leakage across the piston seal when the working fluid is expended and gas pressure remains. As may be appreciated, gas in the working fluid is typically undesirable.

Hence, there is a need for a piston style accumulator that does not exhibit gas-to-fluid leakage across the piston seal when the working fluid is expended and gas pressure remains. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fluid accumulator includes a tank, a piston, and a valve. The tank has an inner surface that defines a tank volume, and has a first fluid inlet/outlet port and a second fluid inlet/outlet port. The piston is movably disposed within the tank volume and engages the inner surface of the tank. The piston divides the tank volume into a first fluid volume and a second fluid volume, where the first fluid volume is in fluid communication with the first fluid inlet/outlet port, the second fluid volume is in fluid communication with the second fluid inlet/outlet port. The valve is coupled to the first fluid inlet/outlet port and includes a valve body, a valve element, a valve spring, a piston contact element, and a load limiter spring. The valve body has a first fluid port and a second fluid port. The valve element is disposed within the valve body and is movable between an open position, in which the first fluid port is in fluid communication with the first fluid volume, and a closed position, in which the first fluid port is fluidly isolated from the first fluid volume. The valve spring is disposed within the valve body and engages the valve element. The valve spring has a first spring constant and supplies a force to the valve element that urges the valve element toward the open position. The piston contact element is spaced apart from, and is movable relative to, the valve element. The load limiter spring is disposed between, and engages, the valve element and the piston contact element, and has a second spring constant that is greater than the first spring constant.

In another embodiment, a fluid accumulator includes a tank a piston, a wall, and a valve. The tank has an inner surface that defines a tank volume, and has a first fluid inlet/outlet port and a second fluid inlet/outlet port. The piston is movably disposed within the tank volume and engages the inner surface of the tank. The piston divides the tank volume into a first fluid volume and a second fluid volume, where the first fluid volume is in fluid communication with the first fluid inlet/outlet port, the second fluid volume is in fluid communication with the second fluid inlet/outlet port. The wall surrounds at least a portion of the valve, extends into the first fluid volume, and defines a piston seat. The valve is coupled to the first fluid inlet/outlet port and includes a valve body, a poppet valve, a valve spring, a piston contact element, and a load limiter spring. The valve body has a first fluid port and a second fluid port. The poppet valve is disposed within the valve body and is movable between an open position, in which the first fluid port is in fluid communication with the first fluid volume, and a closed position, in which the first fluid port is fluidly isolated from the first fluid volume. The valve spring is disposed within the valve body and engages the poppet valve. The valve spring has a first spring constant and supplies a force to the poppet valve that urges the poppet valve toward the open position. The piston contact element is spaced apart from, and is movable relative to, the poppet valve. The load limiter spring is disposed between, and engages, the poppet valve and the piston contact element, and has a second spring constant that is greater than the first spring constant.

In yet another embodiment, a fluid accumulator includes a tank, a piston, a wall, and a valve. The tank has an inner surface that defines a tank volume, and has a first fluid inlet/outlet port and a second fluid inlet/outlet port. The piston is movably disposed within the tank volume and engages the inner surface of the tank. The piston divides the tank volume into a first fluid volume and a second fluid volume, where the first fluid volume is in fluid communication with the first fluid inlet/outlet port, the second fluid volume is in fluid communication with the second fluid inlet/outlet port. The wall surrounds at least a portion of the valve, extends into the first fluid volume, and defines a piston seat. The valve is coupled to the first fluid inlet/outlet port and includes a valve body, a valve element, a valve spring, a piston contact element, and a load limiter spring. The valve body has a first fluid port and a second fluid port. The valve element is disposed within the valve body and is movable between an open position, in which the first fluid port is in fluid communication with the first fluid volume, and a closed position, in which the first fluid port is fluidly isolated from the first fluid volume. The valve spring is disposed within the valve body and engages the valve element. The valve spring has a first spring constant and supplies a force to the valve element that urges the valve element toward the open position. The piston contact element is spaced apart from, and is movable relative to, the valve element. The load limiter spring is disposed between, and engages, the valve element and the piston contact element, and has a second spring constant that is greater than the first spring constant. Movement of the piston supplies a force that moves the valve element to the closed position, and the piston seat is disposed such that it is engaged by the piston after the valve element reaches the closed position.

Furthermore, other desirable features and characteristics of the leak-free piston style accumulator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
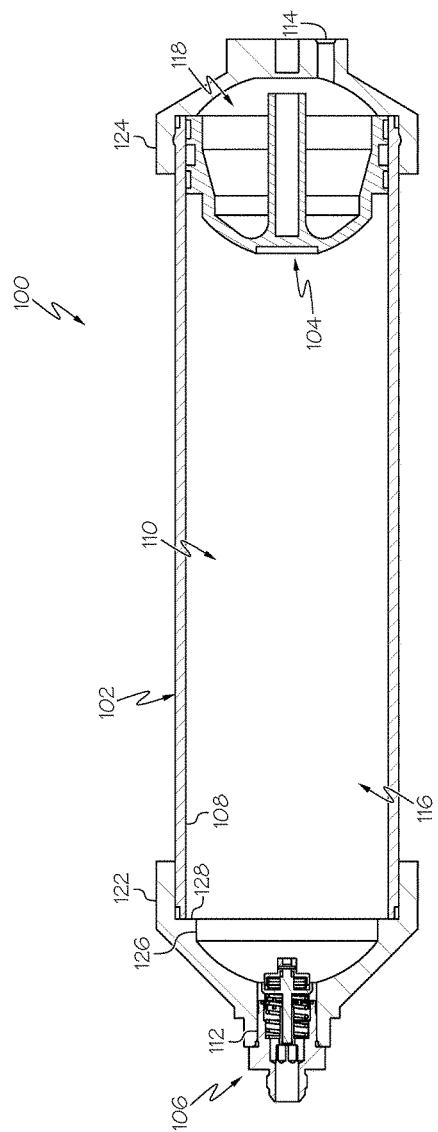
FIG. 1 depicts a cross section view of one embodiment of an accumulator when the accumulator is fully charged.

One embodiment of a fluid accumulator 100 is depicted in FIG. 1. The depicted fluid accumulator 100 is a piston style accumulator, and includes a tank 102, a piston 104, and a valve 106. The tank 100 has an inner surface 108 that defines a tank volume 110, and further includes a first fluid inlet/outlet port 112 and a second fluid inlet/outlet port 114. When the accumulator 100 is installed for use, the first fluid inlet/outlet port 112 is preferably in fluid communication with a working fluid, such as hydraulic fluid, and the second inlet/outlet port 114 is configured to receive a charge of pressurized fluid, such as a gas, and is typically sealed off, trapping the gas charge.

The piston 104 is movably disposed within the tank volume 110 and engages the inner surface 108 of the tank 102. The piston 104 divides the tank volume 110 into two volumes—a first fluid volume 116 and a second fluid volume 118. The first fluid volume 116 is in fluid communication with the first fluid inlet/outlet port 112, and the second fluid volume 118 is in fluid communication with the second fluid inlet/outlet port 114. It is noted that because the piston 104 is movable, the first and second volumes 116, 118 are variable volumes.

Figure 2:
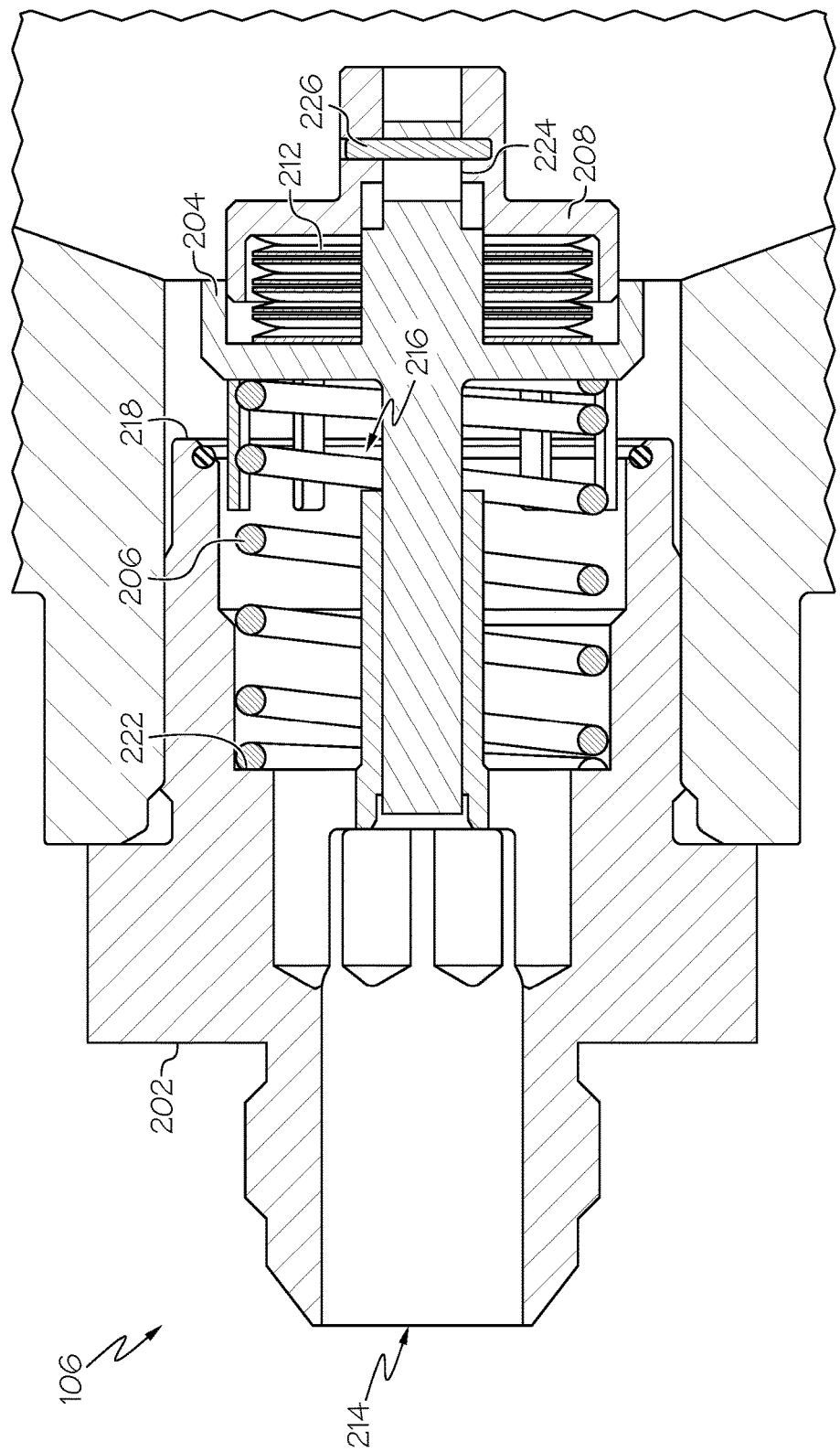
FIG. 2 depicts a close-up cross section view of one embodiment of a valve that may be incorporated into the accumulator of FIG. 1, and with the valve in an open position.
Figure 3:
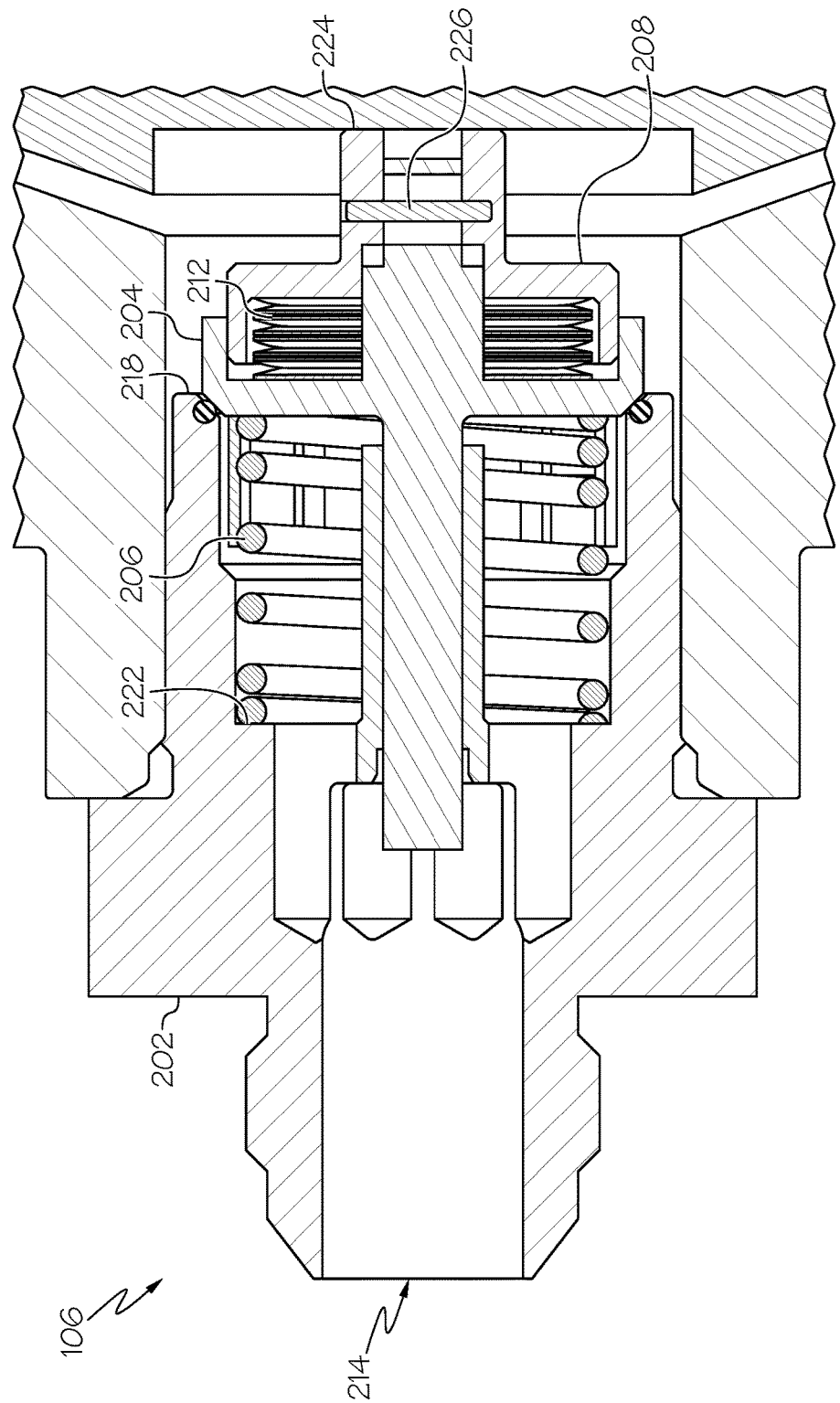
FIG. 3 depicts a close-up cross section view the valve of FIG. 2 in a closed position.

The valve 106 is coupled to the first fluid inlet/outlet port 112 and, as shown more clearly in FIGS. 2 and 3, includes a valve body 202, a valve element 204, a valve spring 206, a piston contact element 208, and a load limiter spring 212. The valve body 202 has a first fluid port 214 and a second fluid port 216. The second fluid port 216 defines a valve seat 218.

The valve element 204 is disposed within the valve body 202 and movable is between an open position, which is the position depicted in FIG. 2, and a closed position, which is the position depicted in FIG. 3. In the open position, the first fluid port 214 is in fluid communication with the first fluid volume 116. In the closed position, the valve element 204 engages the valve seat 218, and fluidly isolates the first fluid port 214 from the first fluid volume 116. It will be appreciated that the valve element 204 may be variously configured and implemented using any one of numerous know valve elements. In the depicted embodiment, however, it is implemented using a poppet valve.

The valve spring 206 is disposed within the valve body 202 and engages the valve element 204 and a spring engagement surface 222 that is formed in the valve body 202. The valve spring 206 has a first spring constant and supplies a force to the valve element 204 that urges the valve element 204 toward the open position. Thus, the valve element 204 is always in the open position except when, as will be described below, the piston 104 is at its end of travel. As such, the valve element does not interfere with normal range fluid flow in and out. It will be appreciated that the valve spring 206 may be variously configured and implemented using any one of numerous know springs. In the depicted embodiment, however, it is implemented using a helical spring. In other embodiments, it may be implemented using a Belleville spring.

The piston contact element 208 is spaced apart from, and is movable relative to, the valve element 204. Although the relative movement functionality may be variously implemented, in the depicted embodiment this is accomplished by forming an opening 224 through a portion of the valve element 204, and extending a pin 226, which is coupled to the piston contact element 208, through the opening 224. As may be appreciated, the opening 224 has a diameter that is sufficient to allow for at least some relative movement between the piston contact element 208 and the valve element 204.

Figure 5:
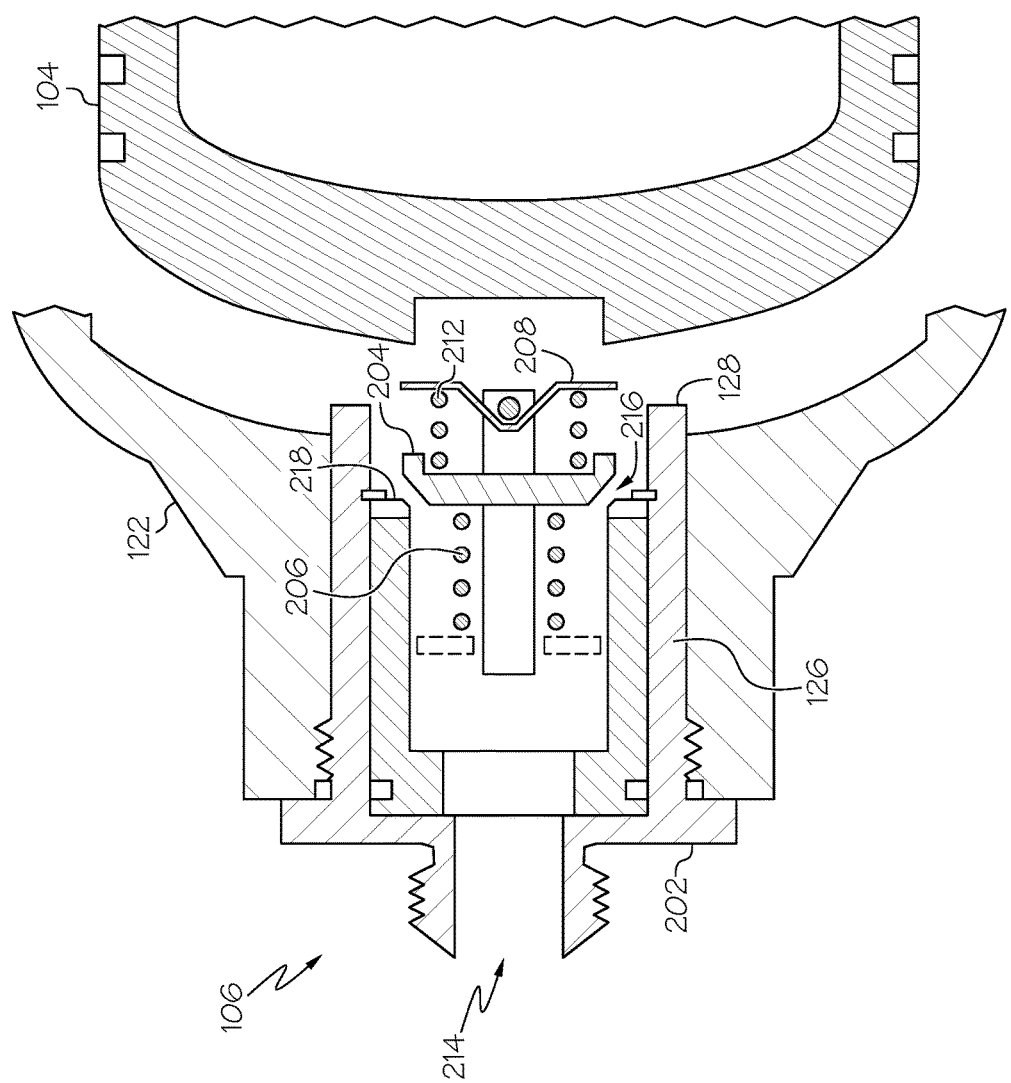
FIG. 5 a cross section view of another embodiment of a valve that may be incorporated into the accumulator of FIG. 1, and with the valve in an open position.

The load limiter spring 212 is disposed between, and engages, the valve element 204 and the piston contact element 208, and has a second spring constant that is greater than the first spring constant. The reason for the greater spring constant will be described further below. It will be appreciated that the load limiter spring 212 may be variously configured and implemented using any one of numerous know springs. In the depicted embodiment, however, it is implemented using a Belleville spring. In other embodiments, such as the one depicted in FIG. 5, it is implemented as a helical spring. It will additionally be appreciated that the specific magnitudes of the first and second spring constants, and the amount by which the second spring constant is greater than the first spring constant may vary. For example, the second spring constant may be 2 or more times greater than the first spring constant. In one embodiment, the second spring constant is 4 times that of the first spring constant, and the first and second spring constants are 25-lbf and 100-lbf, respectively.

Returning once again to FIG. 1, although the tank 102 may be variously configured and implemented, in the depicted embodiment the tank 102 includes a first end cap 122 and a second end cap 124. The first fluid inlet/outlet 112 is formed in the first end cap 122, and the second fluid inlet/outlet 114 is formed in the second end cap 124. In the embodiment depicted in FIG. 1, the accumulator 100 additionally includes a wall 126 that extends into the first fluid volume 116 and defines a piston seat 128. As will be described momentarily, the piston seat 128 is selectively engaged by the piston 104. Before doing so, however, it is noted that the wall 126 and piston seat 128 may be formed on other components. For example, in the embodiment depicted in FIG. 5, the wall 126 and piston seat 128 are formed as part of the valve 106.

Having described the overall structure of the accumulator 100, the operation thereof will now be provided. With continued reference to FIG. 1, it is noted that the accumulator 100 is charged by supplying hydraulic fluid into the first fluid volume 116 via the first inlet/outlet port 112. The valve element 202 is in the open position, thus hydraulic fluid flows the valve 106 and into the first fluid volume 116. A compressed gas, such as nitrogen, is supplied to the second fluid volume 118 via the second inlet/outlet port 114. As hydraulic fluid is expelled from the tank 102, the piston 104 moves, under the force of the pressurized gas, toward the first fluid inlet/outlet 112.

Figure 4:
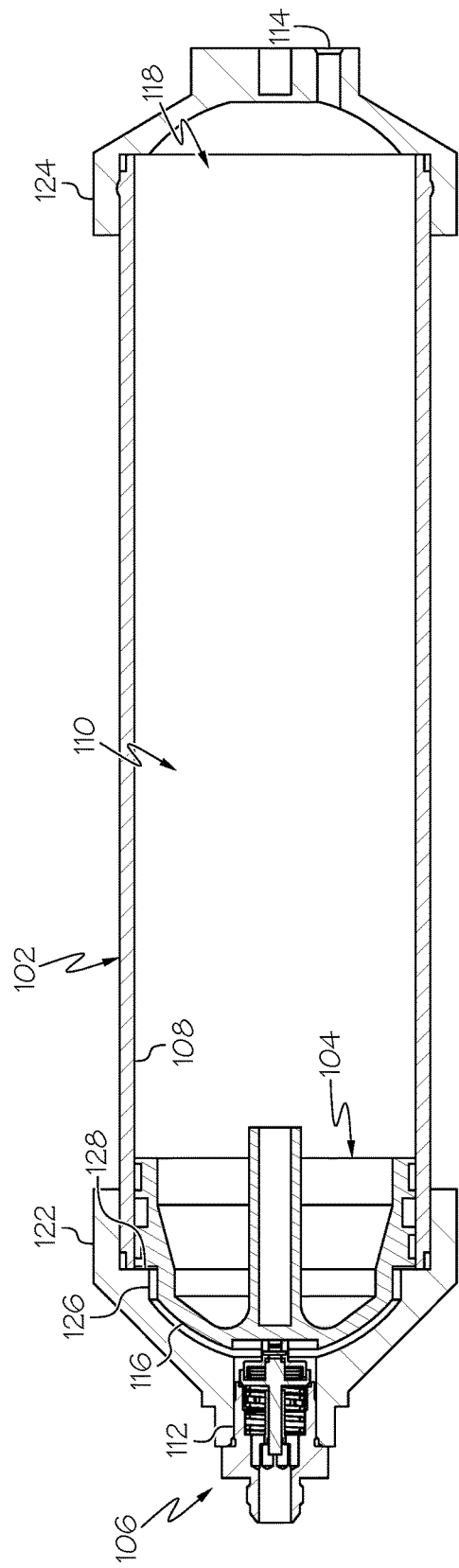
FIG. 4 depicts a cross section view of the accumulator of FIG. 1 when the accumulator is fully discharged.

As more and more hydraulic fluid is expelled, the piston 104 moves closer and closer to the first inlet/outlet 112. Just prior to the accumulator 100 being fully discharged (FIG. 4), the piston 104 engages, and supplies a force to, the piston contact element 208. Because the piston contact element 208 is movable relative to the valve element 204, and the second spring constant is greater than the first spring constant, this force is transmitted through the piston contact element 208 and the load limiter spring 212 to the valve element 204, which moves the valve element 204 to the closed position and compresses the valve spring 206. After the valve element 204 reaches the closed position and is fully seated and sealed, the piston 104 engages the piston seat 128. As such, the piston 104 does not deform or damage the valve element 204 in any way, and further expelling of fluid or gas is prevented. Moreover, when the piston 104 and valve element 204 are seated, the gas and fluid pressures remain high and substantially equal, thereby preventing gas from leaking into the fluid across the piston seal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fluid accumulator, comprising:
a tank having an inner surface that defines a tank volume, the tank having a first fluid inlet/outlet port and a second fluid inlet/outlet port;
a piston movably disposed within the tank volume and engaging the inner surface of the tank, the piston dividing the tank volume into a first fluid volume and a second fluid volume, the first fluid volume in fluid communication with the first fluid inlet/outlet port, the second fluid volume in fluid communication with the second fluid inlet/outlet port; and
a valve coupled to the first fluid inlet/outlet port, the valve comprising:
a valve body having a first fluid port and a second fluid port,
a valve element disposed within the valve body and movable between an open position, in which the first fluid port is in fluid communication with the first fluid volume, and a closed position, in which the first fluid port is fluidly isolated from the first fluid volume,
a valve spring disposed within the valve body and engaging the valve element, the valve spring having a first spring constant and supplying a force to the valve element that urges the valve element toward the open position,
a piston contact element spaced apart from, and movable relative to, the valve element, and
a load limiter spring disposed between, and engaging, the valve element and the piston contact element, the load limiter spring having a second spring constant that is greater than the first spring constant.

2. The accumulator of claim 1, further comprising:
a wall surrounding at least a portion of the valve, the wall extending into the first fluid volume and defining a piston seat.

3. The accumulator of claim 2, wherein:
movement of the piston supplies a force that moves the valve element to the closed position; and
the piston seat is disposed such that it is engaged by the piston after the valve element reaches the closed position.

4. The accumulator of claim 2, wherein:
the tank comprises a first end cap and a second end cap;
the first fluid inlet/outlet port is formed in the first end cap;
the second fluid inlet/outlet port is formed in the second end cap; and
the first end cap comprises the wall.

5. The accumulator of claim 2, wherein:
the tank comprises a first end cap and a second end cap;
the first fluid inlet/outlet port is formed in the first end cap;
the second fluid inlet/outlet port is formed in the second end cap;
the valve comprises the wall.

6. The accumulator of claim 1, wherein the valve element comprises a poppet valve.

7. The accumulator of claim 1, wherein the valve spring comprises a helical spring.

8. The accumulator of claim 1, wherein the load limiter spring comprises a helical spring.

9. The accumulator of claim 1, wherein the load limiter spring comprises a Belleville spring.

10. A fluid accumulator, comprising:
a tank having an inner surface that defines a tank volume, the tank having a first fluid inlet/outlet port and a second fluid inlet/outlet port;
a piston movably disposed within the tank volume and engaging the inner surface of the tank, the piston dividing the tank volume into a first fluid volume and a second fluid volume, the first fluid volume in fluid communication with the first fluid inlet/outlet port, the second fluid volume in fluid communication with the second fluid inlet/outlet port;
a wall surrounding at least a portion of the valve, the wall extending into the first fluid volume and defining a piston seat; and
a valve coupled to the first fluid inlet/outlet port, the valve comprising:
a valve body having a first fluid port and a second fluid port,
a poppet valve disposed within the valve body and movable between an open position, in which the first fluid port is in fluid communication with the first fluid volume, and a closed position, in which the first fluid port is fluidly isolated from the first fluid volume,
a valve spring disposed within the valve body and engaging the poppet valve, the valve spring having a first spring constant and supplying a force to the poppet valve that urges the poppet valve toward the open position,
a piston contact element spaced apart from, and movable relative to, the poppet valve, and
a load limiter spring disposed between, and engaging, the poppet valve and the piston contact element, the load limiter spring having a second spring constant that is greater than the first spring constant.

11. The accumulator of claim 10, wherein:
movement of the piston supplies a force that moves the poppet valve to the closed position; and
the piston seat is disposed such that it is engaged by the piston after the poppet valve reaches the closed position.

12. The accumulator of claim 11, wherein:
the tank comprises a first end cap and a second end cap;
the first fluid inlet/outlet port is formed in the first end cap;
the second fluid inlet/outlet port is formed in the second end cap; and
the first end cap comprises the wall.

13. The accumulator of claim 11, wherein:
the tank comprises a first end cap and a second end cap;
the first fluid inlet/outlet port is formed in the first end cap;
the second fluid inlet/outlet port is formed in the second end cap;
the valve comprises the wall.

14. The accumulator of claim 10, wherein the valve spring comprises a helical spring.

15. The accumulator of claim 10, wherein the load limiter spring comprises a helical spring.

16. The accumulator of claim 10, wherein the load limiter spring comprises a Belleville spring.

17. A fluid accumulator, comprising:
a tank having an inner surface that defines a tank volume, the tank having a first fluid inlet/outlet port and a second fluid inlet/outlet port;
a piston movably disposed within the tank volume and engaging the inner surface of the tank, the piston dividing the tank volume into a first fluid volume and a second fluid volume, the first fluid volume in fluid communication with the first fluid inlet/outlet port, the second fluid volume in fluid communication with the second fluid inlet/outlet port;
a wall surrounding at least a portion of the valve, the wall extending into the first fluid volume and defining a piston seat; and
a valve coupled to the first fluid inlet/outlet port, the valve comprising:
a valve body having a first fluid port and a second fluid port,
a valve element disposed within the valve body and movable between an open position, in which the first fluid port is in fluid communication with the first fluid volume, and a closed position, in which the first fluid port is fluidly isolated from the first fluid volume,
a valve spring disposed within the valve body and engaging the valve element, the valve spring having a first spring constant and supplying a force to the valve element that urges the valve element toward the open position,
a piston contact element spaced apart from, and movable relative to, the valve element, and
a load limiter spring disposed between, and engaging, the valve element and the piston contact element, the load limiter spring having a second spring constant that is greater than the first spring constant,
wherein:
movement of the piston supplies a force that moves the valve element to the closed position; and
the piston seat is disposed such that it is engaged by the piston after the valve element reaches the closed position.

18. The accumulator of claim 17, wherein:
the tank comprises a first end cap and a second end cap;
the first fluid inlet/outlet port is formed in the first end cap;
the second fluid inlet/outlet port is formed in the second end cap; and
the first end cap comprises the wall.

19. The accumulator of claim 17, wherein:
the tank comprises a first end cap and a second end cap;
the first fluid inlet/outlet port is formed in the first end cap;
the second fluid inlet/outlet port is formed in the second end cap;
the valve comprises the wall.

20. The accumulator of claim 17, wherein the valve element comprises a poppet valve.

* * * * *